(12) United States Patent
Kellock et al.

(10) Patent No.: US 12,150,557 B2
(45) Date of Patent: Nov. 26, 2024

(54) TRAVEL SUPPORT STRUCTURE

(71) Applicant: Coolside Limited, East Kilbride (GB)

(72) Inventors: David Kellock, East Kilbride (GB); Michael Corrigan, East Kilbride (GB)

(73) Assignee: Coolside Limited, East Kilbride (GB)

( * ) Notice: Subject to any disclaimer, the term of this patent is extended or adjusted under 35 U.S.C. 154(b) by 0 days.

(21) Appl. No.: 16/789,159

(22) Filed: Feb. 12, 2020

(65) Prior Publication Data
US 2020/0178691 A1 Jun. 11, 2020

Related U.S. Application Data

(63) Continuation of application No. 14/405,115, filed as application No. PCT/GB2013/000246 on May 30, 2013, now Pat. No. 10,617,215.

(30) Foreign Application Priority Data

| | | | |
|---|---|---|---|
| Jun. 2, 2012 | (GB) | ...................................... | 1209898 |
| Jun. 28, 2012 | (GB) | ...................................... | 1211489 |
| May 1, 2013 | (GB) | ...................................... | 1307905 |

(51) Int. Cl.
| | |
|---|---|
| *A47C 7/36* | (2006.01) |
| *A47C 7/38* | (2006.01) |
| *B60N 2/80* | (2018.01) |

(52) U.S. Cl.
CPC ............... *A47C 7/38* (2013.01); *A47C 7/383* (2013.01); *B60N 2/80* (2018.02)

(58) Field of Classification Search
CPC .... A47C 7/36; A47C 7/39; A47C 7/38; A47C 7/383; A47C 16/00; B60N 2/80; A47G 9/10
USPC ..................................... 5/636, 630, 640, 643
See application file for complete search history.

(56) References Cited

U.S. PATENT DOCUMENTS

| | | | | |
|---|---|---|---|---|
| 2,818,063 | A | * 12/1957 | Smith | ...................... A61F 5/055 602/18 |
| 4,520,801 | A | 6/1985 | Lerman | |
| 4,757,554 | A | * 7/1988 | Blair | ................... A41D 13/0512 2/908 |
| 4,782,824 | A | * 11/1988 | Davies | .................... A61F 5/055 601/38 |
| 4,854,306 | A | 8/1989 | Pujals, Jr. | |

(Continued)

FOREIGN PATENT DOCUMENTS

| | | |
|---|---|---|
| CN | 2877445 Y | 3/2007 |
| CN | 102210520 A | 10/2011 |

(Continued)

OTHER PUBLICATIONS

Chinese-language First Exam Report issued in CN Appl. No. 202010080502.5 dated Jan. 4, 2021.

*Primary Examiner* — Fredrick C Conley
(74) *Attorney, Agent, or Firm* — David S. Bradin; Maynard Nexsen PC

(57) ABSTRACT

A support structure for at least partially supporting user's head is described. The support structure comprises a frame having a head engaging portion and a shoulder engaging portion, the shoulder engaging portion adapted to spread the load of the user's head over a user's shoulder, the frame being shaped to the contour of the user's body from the head engaging portion to the shoulder engaging portion.

6 Claims, 6 Drawing Sheets

(56) References Cited

U.S. PATENT DOCUMENTS

| | | | |
|---|---|---|---|
| 5,205,813 A | 4/1993 | Schmidt | |
| 5,505,523 A | 4/1996 | Wang | |
| 6,289,538 B1 | 9/2001 | Fidge | |
| 6,447,468 B1 | 9/2002 | Hankins et al. | |
| 8,418,293 B2 * | 4/2013 | Tansingco | B60N 2/882 |
| | | | 5/636 |
| D957,846 S * | 7/2022 | Kellock | D6/601 |
| 2003/0137178 A1 * | 7/2003 | Craft | A47C 7/467 |
| | | | 297/452.41 |
| 2005/0102758 A1 | 5/2005 | Ramsbottom et al. | |
| 2011/0169316 A1 | 7/2011 | Goei | |
| 2011/0225736 A1 | 9/2011 | Schwingendorf et al. | |
| 2017/0071349 A1 * | 3/2017 | Wong | A47C 7/383 |

FOREIGN PATENT DOCUMENTS

| | | |
|---|---|---|
| GB | 2049436 A | 12/1980 |
| GB | 2234905 A | 2/1991 |
| WO | 2005039441 A2 | 5/2005 |

* cited by examiner

TRAVEL SUPPORT STRUCTURE

This application is a continuation of U.S. patent application Ser. No. 14/405,115, filed on Dec. 2, 2014, now U.S. Pat. No. 10,617,215, which was a 35 U.S.C. § 371 application of International Application No. PCT/GB2013/000246, filed on May 30, 2013, which claimed the benefit of priority to United Kingdom Patent Application No. 1307905.8, filed on May 1, 2013, and to United Kingdom Patent Application No. 1211489.8, filed on Jun. 28, 2012, and to United Kingdom Patent Application No. 1209898.4, filed on Jun. 2, 2012.

FIELD OF THE INVENTION

The present invention relates to a support structure for at least partially supporting a user's head when travelling. Particularly, the support structure is to at least partially support a user's head when sleeping whilst sitting in a relatively upright position.

BACKGROUND TO THE INVENTION

The use of travel pillows is common practice for passengers in cars, planes, buses and trains. There are four main types of travel pillow, currently on the market: memory foam pillows, polystyrene bead filled pillows, air filled pillows and feather or stuffing filled pillows.

These pillows come in various forms, but generally fall into one of three categories: C-shaped, O-shaped, or L shaped.

The pillows currently on the market are generally aesthetically unpleasant and have further drawbacks. For example, the U-shaped pillows generally do not support a user's head at the front below the chin, or at the sides, which causes the chin to fall forward and the neck to lie at an awkward angle, the O-shaped pillows do not cater for a wide enough range of different neck sizes the air filled pillows can be difficult to inflate and to plug shut and the stuffed pillows are so poor they don't even provide any support. The bead-filled pillows are better, as they can be quite firm, but also lack support in the upright position at the front of the neck. Furthermore, the conventional neck pillows can move in use, particularly away from the desired area of contact with the user, to be less supportive.

SUMMARY OF THE INVENTION

According to a first aspect of the present invention there is provided a support structure for at least partially supporting a user's head, the support structure comprising:

a frame having a head engaging portion and a shoulder engaging portion, the shoulder engaging portion adapted to spread the load of the user's head over a user's shoulder, the frame being shaped to the contour of the user's body from the head engaging portion to the shoulder engaging portion.

In at least one embodiment of the present invention, a support structure having a frame which follows the contours of the user's body, provides a support structure which is unobtrusive and can be concealed by a scarf, for example.

The frame may be of substantially constant thickness.
The frame may have first surface and a second surface.
The first surface may be substantially convex.
The second surface may be substantially concave.
The first surface may, directly or indirectly, be a user engaging surface.

The head engaging portion and the shoulder engaging portion may define the first surface.

The first surface and the second surface may be substantially parallel.

The frame may define a continuous surface.
The frame may be a sheet.
The frame may be a flexible sheet.
The frame may be resilient.

The head engaging portion and the shoulder engaging portion may be hingedly connected. Such an arrangement permits flat packing of the product.

The head engaging portion may be substantially flat

Alternatively or additionally, the head engaging portion may comprise a first limb and a second limb.

The first head engaging portion limb and the second head engaging portion limb may be connected by a head engaging portion connecting member.

The head engaging portion connecting member may connect the limb at a location distal from an end of each head engaging portion limb. Such an arrangement permits the limbs to extend away from the connecting member making the device comfortable for users of different neck lengths.

The shoulder engaging portion may comprise a first shoulder engaging portion limb and a second shoulder engaging portion limb, the first and second shoulder engaging portion limbs extending from the head engaging portion.

The first shoulder engaging portion limb and the second shoulder engaging portion limb may be connected by a shoulder engaging portion connecting member.

The shoulder engaging portion first and second limbs may be adapted to straddle a user shoulder. In this embodiment, one shoulder engaging portion limb extends, in use, down the front of a user's shoulder and the other shoulder engaging portion limb extends down the back of the user's shoulder.

The shoulder engaging portion connecting member may connect the limb at a location distal from an end of each shoulder engaging portion limb. Such an arrangement permits the limbs to extend away from the connecting member making the device comfortable for users of different neck lengths.

Where there is a head engaging portion first limb and a head engaging portion second limb, the support structure may further comprise a head engaging portion bridging means connecting the first head engaging portion limb to the second head engaging portion limb. The head engaging portion bridging means is adapted to span the gap between the head engaging portion limbs.

Where there is a shoulder engaging portion first limb and a shoulder engaging portion second limb, the support structure may further comprise a shoulder engaging portion bridging means connecting an end of the first shoulder engaging portion limb to an end of the second shoulder engaging portion limb, the first and second shoulder engaging portion limb ends being distal from the head engaging portion. In this embodiment, the bridging means extends over the shoulder, in use, to distribute the weight of the user's head over a greater area. The shoulder engaging portion bridging means is adapted to span the gap between the shoulder engaging portion limbs.

The support structure may comprise an anchoring means adapted to secure the support structure, in use, to a user.

The anchoring means may be adapted to secure the support structure, in use, to a user's neck. The anchoring means may be adapted to press the support structure against a user's neck.

The anchoring means may define a support structure receiving portion.

The support structure receiving portion may be a pocket.

The anchoring means may comprise a fabric material.

The anchoring means may comprise an elongate length of fabric material. The fabric material may be a scarf.

The support structure receiving portion may be located at a first end of the fixing means.

The head engaging portion bridging means and the shoulder engaging portion bridging means may be defined by the anchoring means.

The head engaging portion bridging means and the shoulder engaging portion bridging means may be defined by the support structure receiving portion.

The bridging means may be a web.

The frame may be adapted, in use, to compress under the weight of a user's head.

Where there is a head engaging portion connecting member and a shoulder engaging connecting member, the connecting members may engage as the frame compresses.

Where the connecting members engage, the connecting members may resist further compression of the frame.

According to a second aspect of the present invention there is provided a method of supporting a user's head, the method comprising the steps of:

engaging a frame having a head engaging portion and a shoulder engaging portion to a user such that the head engaging portion engages the person's head and the shoulder engaging portion engages this user's shoulder and the frame follows the contour of the user's body from the head engaging portion to the shoulder engaging portion and the frame shoulder engaging portion spreads the load of the user's head over the user's shoulder.

BRIEF DESCRIPTION OF THE DRAWINGS

An embodiment of the present invention will now be described with reference to the accompanying Figures in which;

FIG. 6, comprising

DETAILED DESCRIPTION OF THE DRAWINGS

Figure 1:
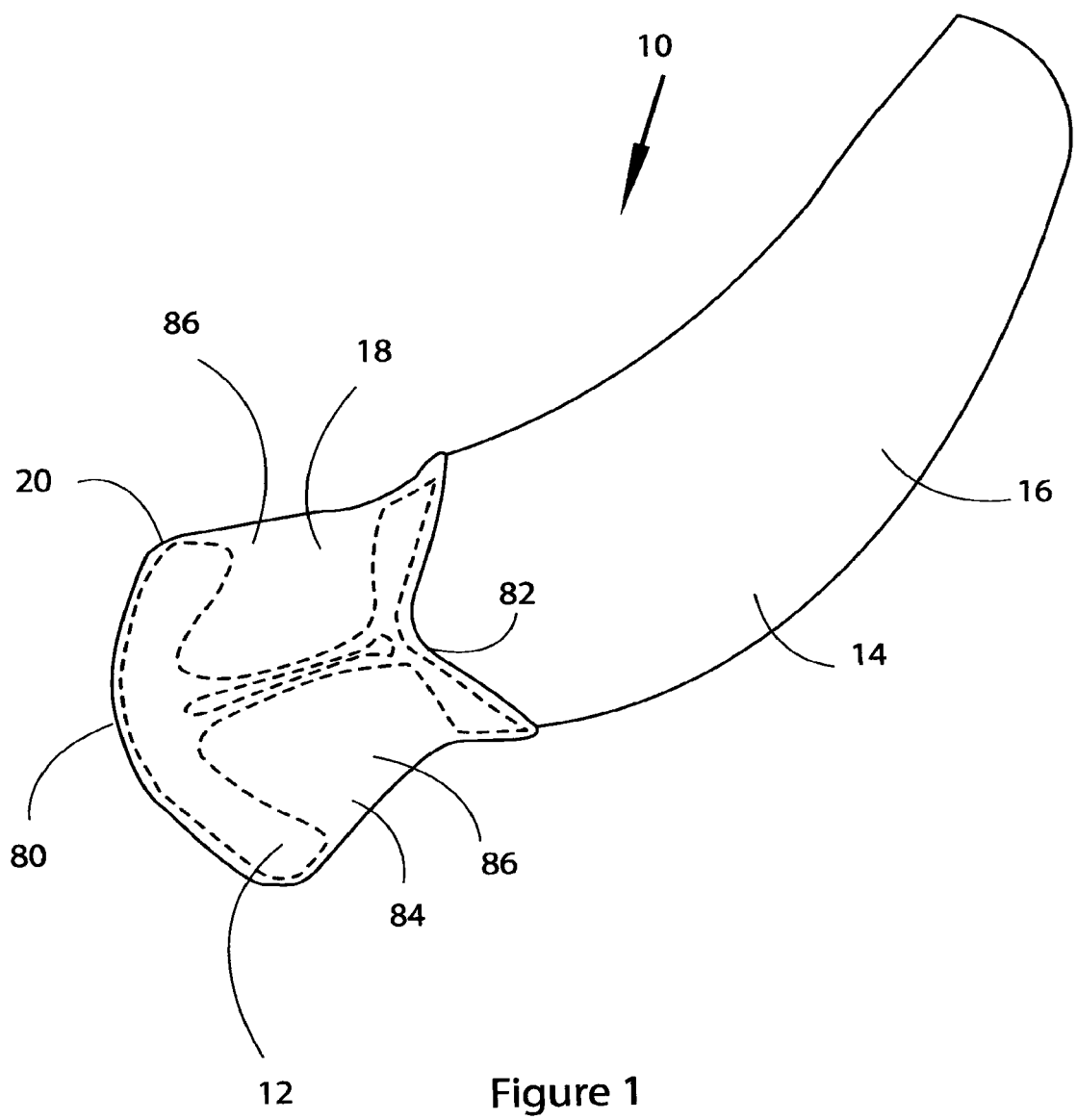
FIG. 1 is a perspective view of a support structure for at least partially supporting a user's head, according to a first embodiment of the present invention.
Figure 2:
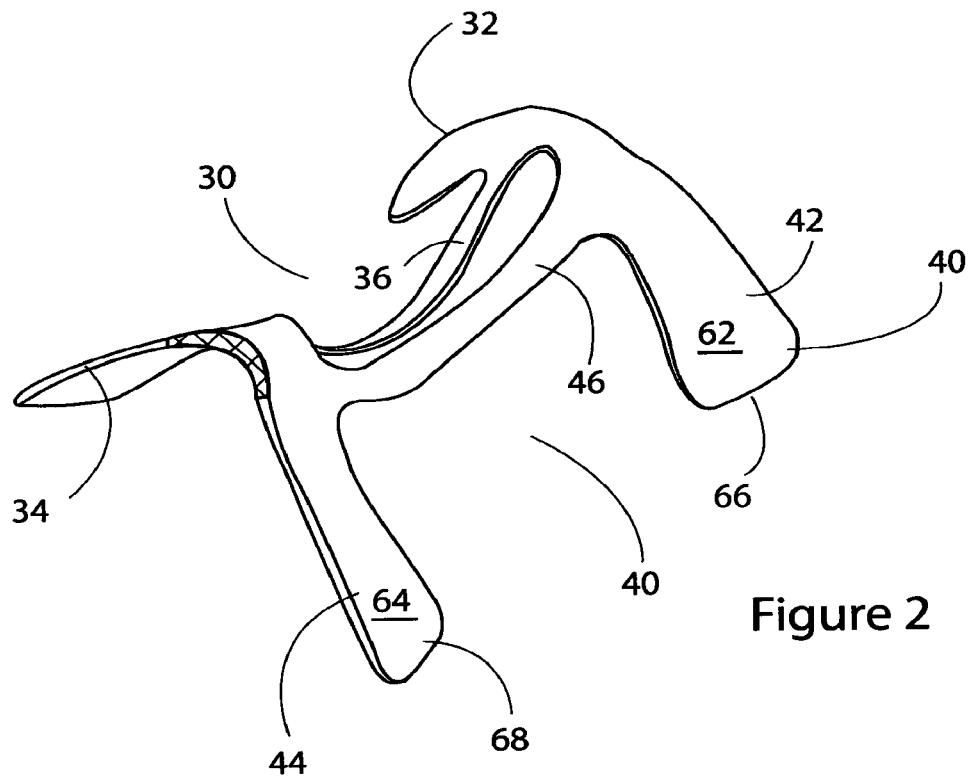
FIG. 2 is a perspective view of part of the support structure frame of FIG. 1.
Figure 3:
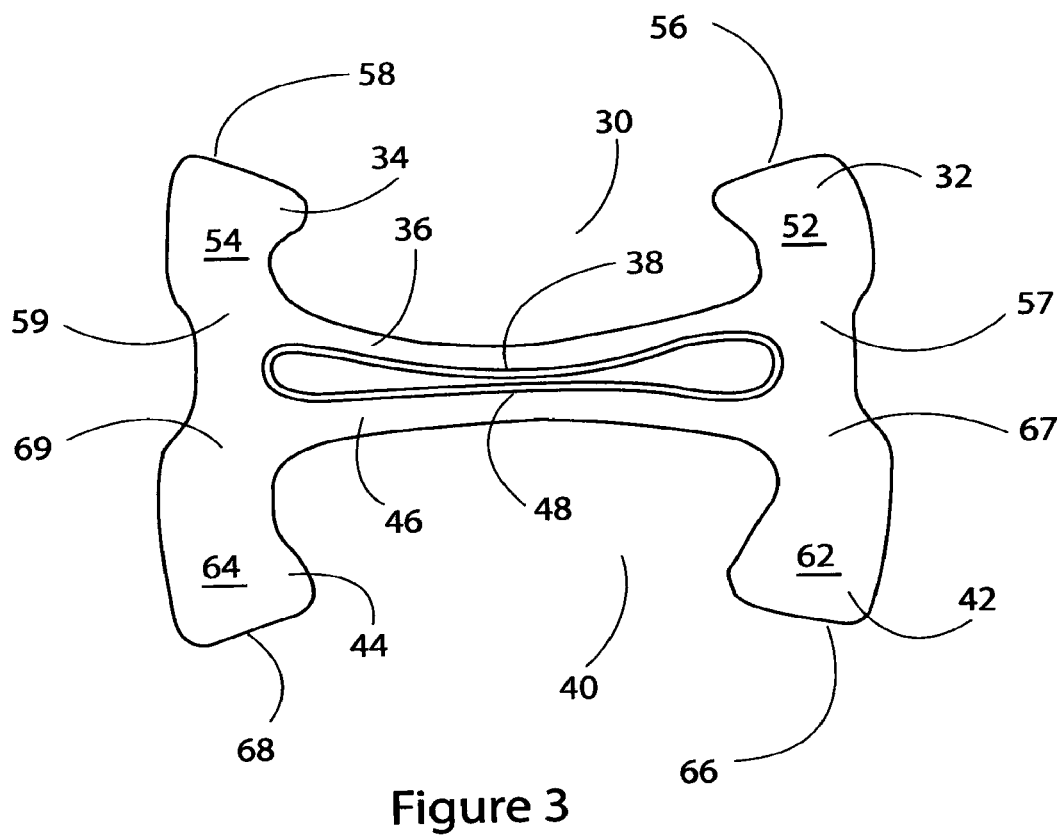
FIG. 3 is a top view of the support structure frame of FIG. 1.
Figure 4:
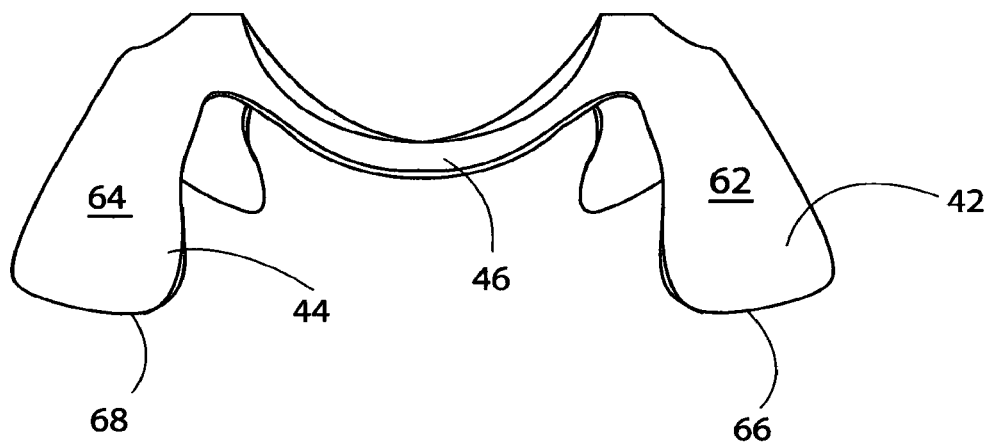
FIG. 4 is a side view of the support structure frame of FIG. 1.
Figure 5:
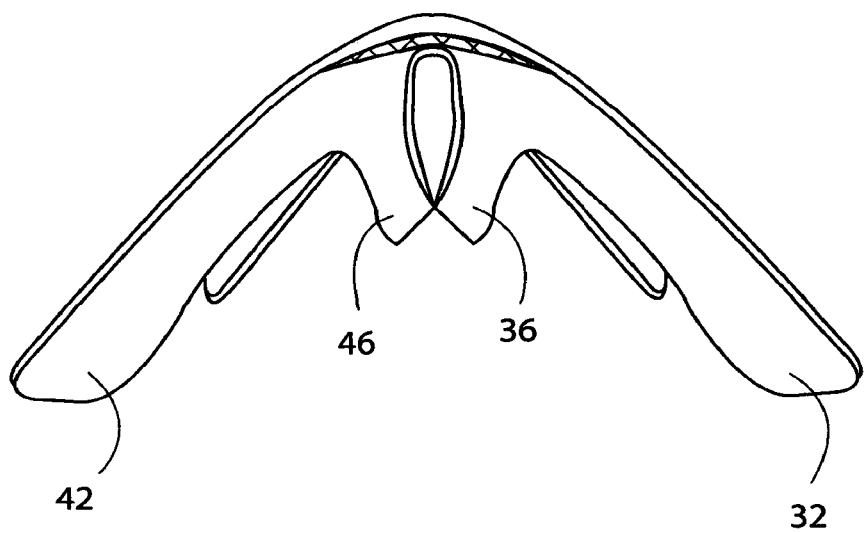
FIG. 5 is an end view of the support structure frame of FIG. 1.

Referring firstly to FIG. 1, a perspective view of a support structure, generally indicated by reference numeral 10 for at least partially supporting a user's head (not shown) according to a first embodiment of the present invention.

The support structure 10 comprises a frame 12 and an anchoring means 14 in the form of a scarf 16. The frame 12 is contained within a pocket 18 located at a first end 20 of the scarf 16.

The frame 12 will now be described in more detail with reference to FIGS. 2, 3, 4 and 5, perspective, top, side and then views of the support structure frame 12 of FIG. 1.

The frame 12 comprises a single piece of resilient polymeric material and defines a head engaging portion 30 and a shoulder engaging portion 40. As will be shown, the shoulder engaging portion 40 is adapted to spread the load of the user's head over a user's shoulder. The frame 12 is shaped to the contour of the user's body from the head engaging portion 30 the shoulder engaging portion 40.

The head engaging portion 30 comprises a first head engaging limb 32 and a second head engaging limb 34, the first and second head engaging limbs 32, 34, being connected by a head engaging portion connecting member 36.

The shoulder engaging portion 40 comprises a first shoulder engaging limb 42 and a second shoulder engaging limb 44, the first and second shoulder engaging limbs 42, 44 being connected by a shoulder engaging portion connecting member 46.

The head engaging portion limbs 32, 34 have respective head engaging surfaces 52, 54 which are angled towards each other to cup, in use, a part of user's jaw. Similarly, the shoulder engaging portion limbs 42, 44 have respective shoulder engaging surfaces 62, 64 which also angled towards each other to cup between them two portions of the convex surface of a user's shoulder when in use.

It will be noted, the limbs 32, 34, 42, 44 are paddle shaped in that they are wider at their free ends, 56, 58, 66, 68 than at their connecting ends 57, 59, 67, 69 where they join their respective connecting members 36, 46

In the embodiment shown in FIG. 2-FIG. 5, the frame 12 is in an uncompressed configuration. That is, the configuration shown on these Figures is a "not in use" configuration, the frame 12 being adapted to be compressed under the weight of the user's head. In this uncompressed configuration, the head engaging portion connecting member 36 and the shoulder engaging portion connecting member 46 are in contact at their respective midpoint's 38, 48. This will be discussed further in due course In use, the frame 12 is fitted into the pocket 18 of the scarf 16. Referring to FIG. 1, the sides of the pocket 80, 82 maintain a substantially constant spacing between the head engaging portion limbs 32, 34 and a substantially constant spacing between the shoulder engaging portion limbs 42, 44. The scarf surface 84 providing a bridging means 86 to provide a comfortable contact surface for the user.

Operation of the support structure 10 will now be described with reference to FIG. 6 comprising FIGS. 6A-6D, a sequential series showing fitting of the support structure 10 to a user 100.

The user 100 places the first end of the scarf 20 containing the frame 12 inside the scarf pocket 18 against their neck 102 such that the frame head engaging portion 30 rests against the underside of the user's jaw 104 and the frame shoulder engaging portion 40 lies across the user's shoulder 106.

The user 100 takes a scarf second end 108 and passes it around their neck 102, until the scarf encircles their neck 102.

The scarf first and second ends 20, 108 are provided with hook and loop fastener portions 110, 112 which are brought together to secure the support structure to the user 100, thereby providing structure 10 adapted to at least partially support the user's head 114 permitting them to sleep comfortably in an upright position.

Figure 6A:
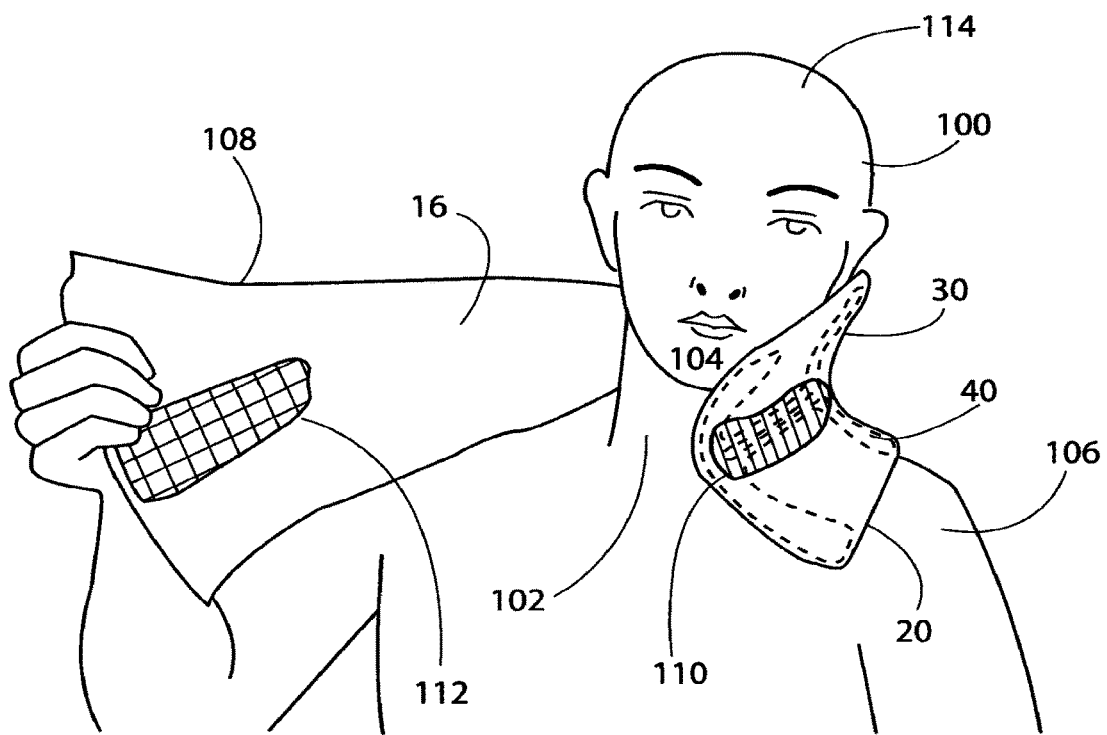
FIGS. 6A to 6D, is a sequential series of views showing support structure of FIG. 1 being used by a user.
Figure 6B:
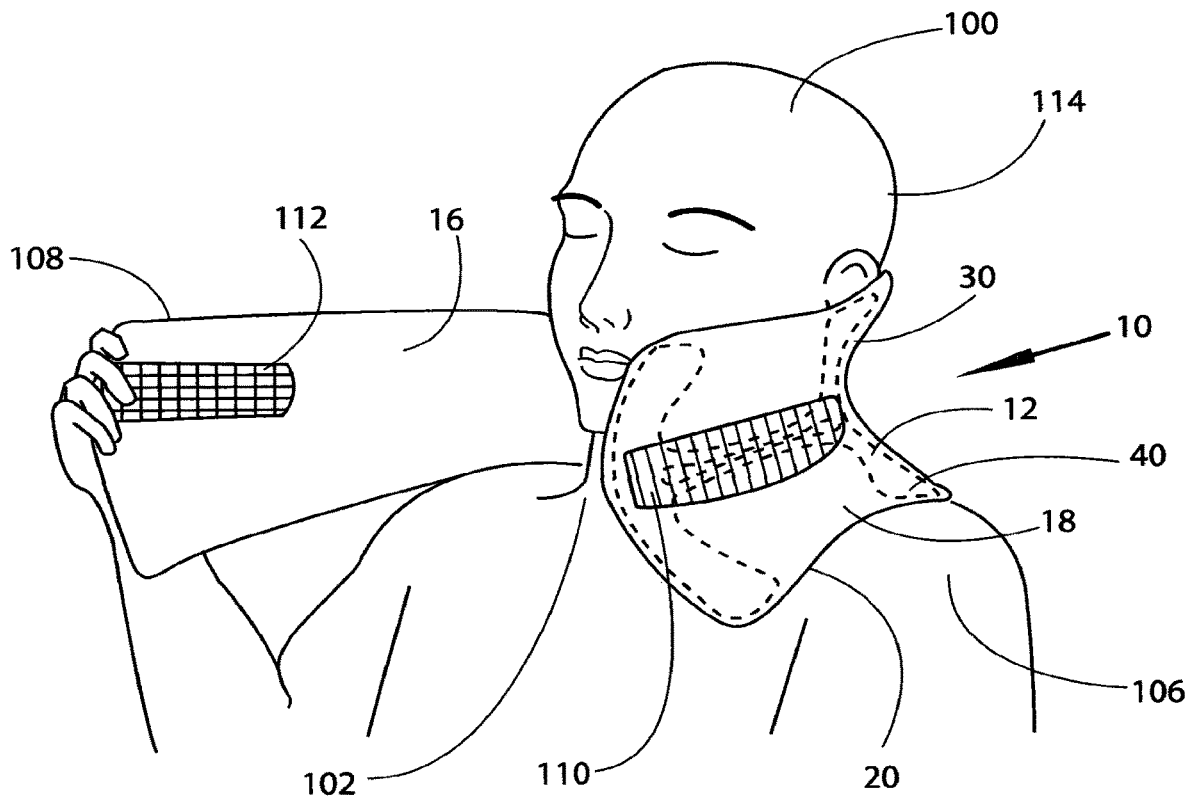
Figure 6C:
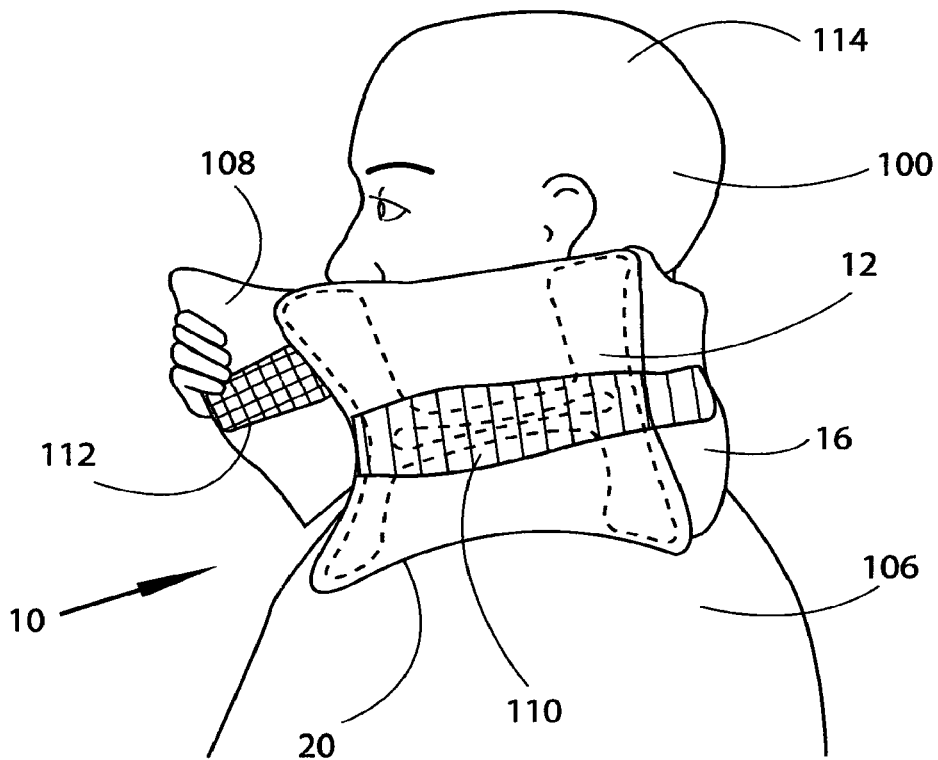
Figure 6D:
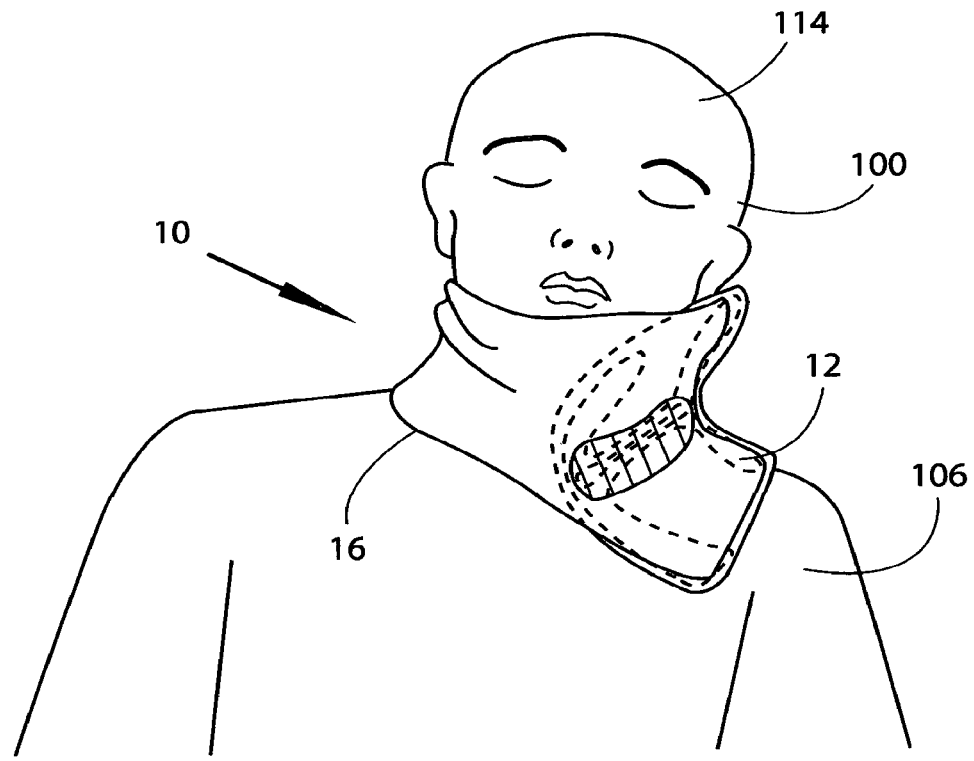
Figure 7:
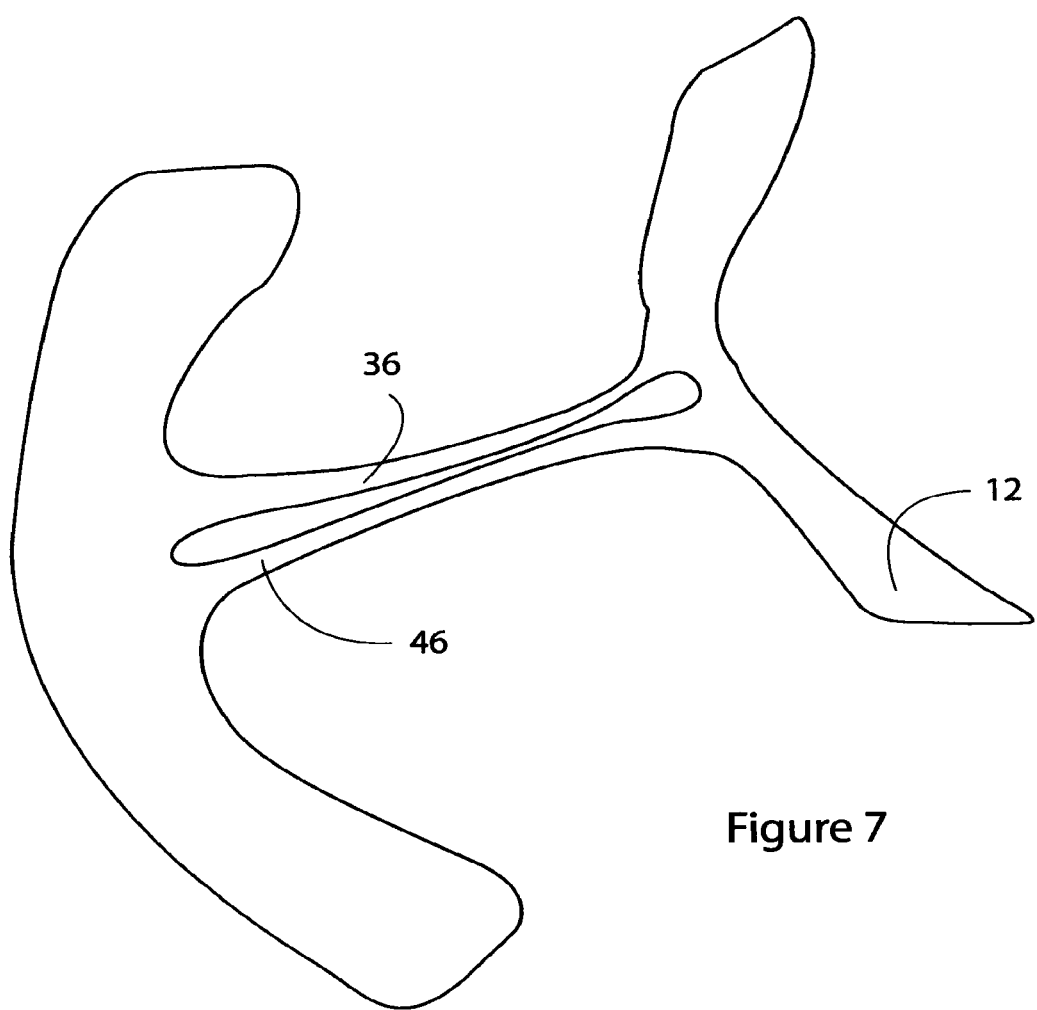
FIG. 7 is a close-up of the support structure frame of FIG. 6B.

Referring to FIG. 7, a close-up of the frame 10 shown in FIG. 6B in which the frame 12 is partially compressed, it will be noted that the head engaging portion connecting member 36 and a shoulder engaging portion connecting member 46 for much of the length of the respective portions. This provides extra rigidity to the support structure 10, allowing for an initial "give" when the user 100 puts the weight of their head 114 on the support structure 10 by providing more resistance as the user applied weight increases and the size of the contact area between the connecting members 36, 46 increases.

Various modifications and improvements may be made to the above described embodiments without departing from the scope of the present invention. For example, the bridging means may include an elasticated strap between the free ends of the limbs.

The invention claimed is:

1. A frame comprising:
    a connector having a semi-circular profile that delineates a first concavity;
    a first limb and a second limb operatively coupled to a first side of the connector and spaced apart from one another via the connector, the first and second limbs cooperating to delineate a first cup, where the first limb includes a first limb concave arcuate surface angled toward a second limb concave arcuate surface of the second limb, where the second limb concave arcuate surface is angled toward the first limb concave arcuate surface; and,
    a third limb and a fourth limb operatively coupled to a second side of the connector, the third limb includes a third limb arcuate surface angled toward a fourth limb arcuate surface of the fourth limb, where the third limb arcuate surface and the fourth limb arcuate surface cooperate to delineate a second cup, and where the first side is generally opposite the second side; wherein the frame is fabricated from a resilient polymer, where the first limb includes a free end that is independently repositionable with respect to a free end of the second limb.

2. A method of assembling a travel pillow, the method comprising:
    inserting a resilient polymer frame into a pocket so that the pocket takes on the shape of the resilient polymer frame, the resilient polymer frame including:
    a first projection coupled to a second projection, the first and second projections configured to cooperate and delineate a first concavity,
    a third projection coupled to a fourth projection, the third and fourth projections configured to cooperate and delineate a second concavity,
    an arcuate connector coupling the first projection to the second projection, the arcuate connector including an orifice and delineating a third concavity,
    wherein the frame is fabricated from a resilient polymer; and, wrapping a scarf around the pocket, after the resilient polymer frame is inserted into the fabric pocket.

3. The method of claim 2, wherein the pocket is part of the scarf.

4. The method of claim 2, further comprising:
    attaching a first portion of the scarf to a second portion of the scarf after wrapping the scarf around the fabric pocket.

5. The method of claim 4, wherein:
    the first portion of the scarf includes loop fasteners; and, the second portion of the scarf includes hook fasteners.

6. The method of claim 2, wherein:
    inserting the resilient polymer frame into the pocket includes creating a first pocket concavity, a second pocket concavity, and a third pocket concavity;
    where the first, second, and, third concavities are formed upon a common surface.

* * * * *